United States Patent
Payment et al.

(10) Patent No.: US 12,289,247 B2
(45) Date of Patent: Apr. 29, 2025

(54) ROLE-BASED ACCESS CONTROL SYSTEM FOR MANAGING ACCESS TO RESOURCES

(71) Applicant: Twilio Inc., San Francisco, CA (US)

(72) Inventors: Alexandre Payment, San Francisco, CA (US); Liran Nuna, Austin, TX (US); Mario Niebla, Encinitas, CA (US); Poojita Suri, San Francisco, CA (US); Ridhi Sahni, Mountain View, CA (US); Vivek K. Laddha, San Ramon, CA (US); Yoolhee Kayla Jin, South Pasadena, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 17/661,003

(22) Filed: Apr. 27, 2022

(65) Prior Publication Data
US 2023/0353503 A1     Nov. 2, 2023

(51) Int. Cl.
    H04L 47/762    (2022.01)
    H04L 47/78     (2022.01)
    H04L 47/80     (2022.01)

(52) U.S. Cl.
    CPC .......... H04L 47/762 (2013.01); H04L 47/781 (2013.01); H04L 47/808 (2013.01)

(58) Field of Classification Search
    CPC .... H04L 47/762; H04L 47/781; H04L 47/808
    See application file for complete search history.

(56) References Cited

U.S. PATENT DOCUMENTS

| | | | |
|---|---|---|---|
| 10,142,349 B1 * | 11/2018 | Tomlin | H04L 63/101 |
| 10,432,639 B1 * | 10/2019 | Bebee | G06F 16/90335 |
| 2014/0207861 A1 | 7/2014 | Brandwine et al. | |
| 2014/0330856 A1 * | 11/2014 | Rissanen | G06F 21/6218 707/759 |
| 2014/0351953 A1 * | 11/2014 | Bhatia | H04N 21/8586 726/27 |
| 2015/0193635 A1 * | 7/2015 | O'Neill | G06F 21/6281 726/28 |
| 2018/0041491 A1 | 2/2018 | Gupta et al. | |
| 2019/0012221 A1 * | 1/2019 | Luthra | H04L 67/146 |
| 2019/0332789 A1 * | 10/2019 | Vandenbrouck | G06F 21/6218 |
| 2020/0120098 A1 * | 4/2020 | Berg | H04L 63/104 |
| 2020/0244799 A1 | 7/2020 | Lawson et al. | |

(Continued)

FOREIGN PATENT DOCUMENTS

WO    2023212593    11/2023

OTHER PUBLICATIONS

"International Application Serial No. PCT US2023 066237, International Search Report mailed Jul. 11, 2023", 2 pgs.

(Continued)

*Primary Examiner* — Glenton B Burgess
*Assistant Examiner* — Jihad K Boustany
(74) *Attorney, Agent, or Firm* — Schwegman Lundberg & Woessner, P.A.

(57) ABSTRACT

A role-based access control method and system provide for receiving a request to provide access to a resource, identifying an identity associated with the request, classifying the URI into a permission that allows access to the resource, generating a graph representing the one or more granted permissions, and authorizing the request including traversing the graph to determine that the first permission is included in the one or more granted permissions.

20 Claims, 8 Drawing Sheets

(56) References Cited

U.S. PATENT DOCUMENTS

| | | | | |
|---|---|---|---|---|
| 2020/0252405 A1* | 8/2020 | Sankavaram | ............ | G06F 21/62 |
| 2020/0403996 A1* | 12/2020 | Parimi | .................... | H04L 63/10 |
| 2021/0306377 A1* | 9/2021 | Kundu | .................... | H04L 63/20 |
| 2022/0067194 A1* | 3/2022 | Thakur | ............... | G06F 21/6227 |
| 2023/0208840 A1* | 6/2023 | Venable | ................ | H04L 63/102 |
| | | | | 726/1 |

OTHER PUBLICATIONS

"International Application Serial No. PCT US2023 066237, Written Opinion mailed Jul. 11, 2023", 8 pgs.

\* cited by examiner

ROLE-BASED ACCESS CONTROL SYSTEM FOR MANAGING ACCESS TO RESOURCES

TECHNICAL FIELD

The subject matter disclosed herein generally relates to methods, systems, and machine-readable storage media for techniques to manage access to computing resources using role-based access control.

BACKGROUND

Current communication systems provide users with permissions to access resources based on limited types of roles, resulting in unintended access to resources that are restricted for certain users. The capability of providing more granular and precise role-based access control is becoming increasingly important.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
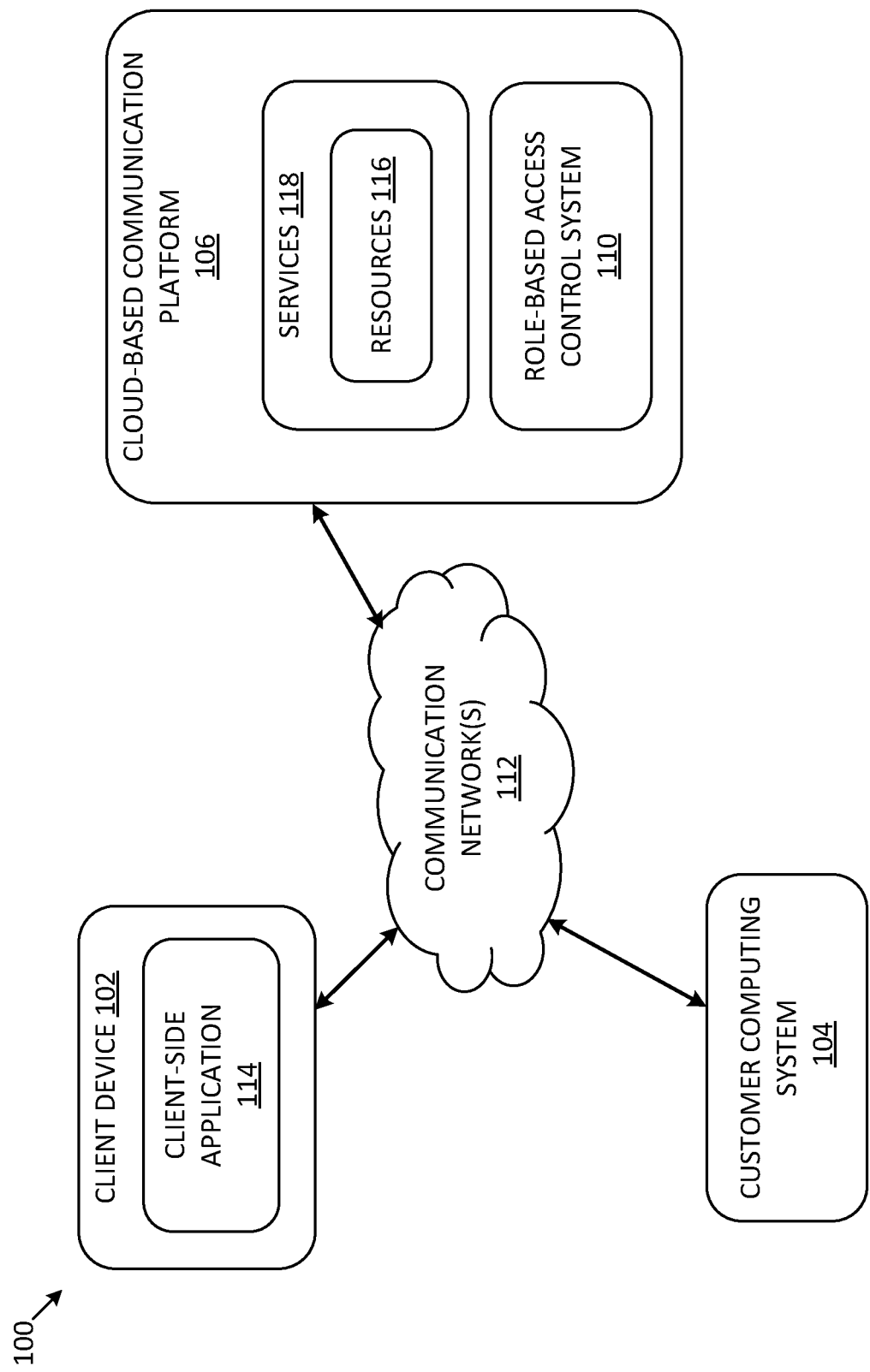
FIG. 1 depicts a block diagram showing an example networked environment in which the disclosed technology may be practiced, according to various example embodiments.

The description that follows includes systems, methods, techniques, instruction sequences, and computing machine program products that embody illustrative embodiments of the present disclosure. In the following description, for purposes of explanation, numerous specific details are set forth in order to provide a thorough understanding of example embodiments. It will be evident, however, to one skilled in the art that the present inventive subject matter may be practiced without these specific details.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Various embodiments include systems, methods, and non-transitory computer-readable media for generating and managing access to resources using role-based access control. When receiving a request to provide access to a resource in a communication platform (e.g., via a console interface or an API interface), a role-based access control (RBAC) system uses a Uniform Resource Identifier (URI) analyzing component to analyze the request and classifies the URI into a permission. A permission is an authorization granted to an identity (e.g., a user, an application, or a credential, such as an API Key) to perform an action on a resource specified in the permission. A permission may be represented by a text string that includes four parts: namespace, product name, resource name, and the type of action. Each of these parts is an identifier separated by a "/," such as/namespace/product name/resource name/action. For example, a permission to make a phone call can be represented by a text string "/entity/product/call/create." A text string may correspond to an assertion that maps to one or more URIs.

A resource is associated with a public URI and method (e.g., GET, PUT, POST, DELETE). The communication platform may register multiple URIs for a single permission and may register multiple permissions for a single role. Once a permission is granted, the user may perform the action on the particular resource associated with the product and namespace (e.g., an entity) specified in the permission. Actions configured to be performed on resources may include, for example, read, create, update, delete, list, and do.

In various embodiments, a role may be created for or assigned to an identity to include one or more permissions. In various embodiments, a user may be a person, or a group of people. A permission can be assigned to an application (e.g., an application associated with an application user), or to a credential (e.g., an API Key). An application may be developed by a third party (e.g., a customer) using client-side SDK kits provided by the communication platform.

In various embodiments, if the RBAC system is unable to classify the URI into an existing permission, the RBAC system may deny the request, discard the request, or redirect the request to a system communicatively coupled to the communication platform for handling.

Figure 6:
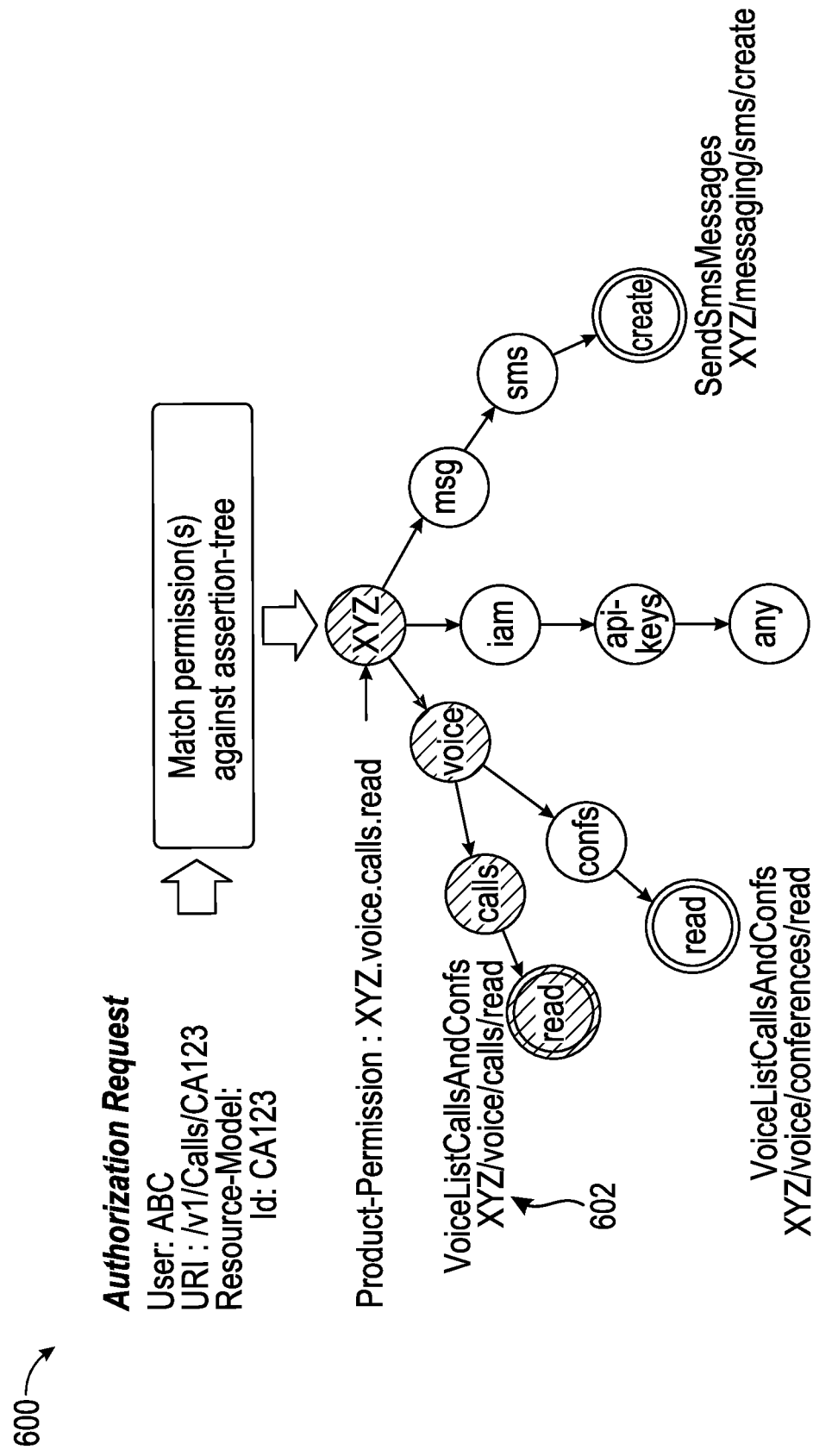
FIG. 6 depicts a block diagram illustrating an example assertion tree, according to various example embodiments.

In various embodiments, the RBAC system generates a graph, such as a tree structure, of all the permissions the user has been granted, and traverses the graph to match the classified permission with a permission included in the graph, such as the graph (also referred to as assertion tree)

illustrated in FIG. 6. If the RBAC system determines there is a match, the request will be granted. Otherwise, the request will be denied. In various embodiments, the assertion tree may be generated at run time and dynamically updated at run time. For example, once an assertion tree is generated at run time, it may be stored in volatile computer memory (e.g., cache memory) for a limited time period, as a user is likely to request access to resources again shortly after making the first request. In various embodiments, a session may be initiated once a request is authorized for an identity (e.g., a user, an application, or a credential). The graph may be temporarily stored in cache memory for the duration of the session.

In various embodiments, the RBAC system causes a display of a user interface, including an indication of authorization status indicating whether the request is granted. For example, the indication of authorization status may be a selectable user interface element (e.g., a window or an icon) notifying the user the request is allowed or denied. In some examples, if the request is granted, the RBAC system may cause the requested resource to be accessible to the requesting user (e.g., displaying the resource in the user interface) or cause the action specified in the permission to be automatically executed (e.g., deleting the resource specified in the request).

In various embodiments, the RBAC system may receive a request to assign a role (e.g., a customized role) to an identity. The role is associated with a list of permissions. The RBAC system may match the list of permission specified in the request to existing permissions available on the communication platform and generate the role for the identity by associating the list of permissions with an identity. In various embodiments, the RBAC system provides existing permissions available on the communication platform to a customer so that the customer can create a role that can be assigned to an identity. This assignment may associate the list of permissions included in a role with the identity for access within a scope of resources.

In various embodiments, a communication platform may include a number of products in the namespace. A resource may be a product, or a feature associated with a product, such as a phone number, a call record, a studio flow, or a message. The RBAC system may reside in the communication platform, as illustrated in FIG. 1, or may be an external system that is communicatively coupled to the communication platform.

In various embodiments, a request may be an API request that can be authorized using an API key. An API request occurs when an identity (e.g., a user or an application) makes a call to a server using an API endpoint. An API endpoint refers to a touchpoint of an interaction between an API and a system. An API endpoint provides the location where an API accesses a resource.

In various embodiments, a permission can register multiple URIs to accommodate multiple interfaces and system versions that can be used to access the resource, e.g., public API endpoints, console, SDK, etc.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 depicts a block diagram showing an example networked environment 100 in which the disclosed technology may be practiced, according to various example embodiments. As shown in FIG. 1, the example networked environment 100 includes multiple computing devices (e.g., client device 102), customer computing system 104, and cloud-based communication platform 106 communicatively coupled to a communication network 112 and configured to communicate with each other through the use of the communication network 112. The cloud-based communication platform 106 includes resources 116 and a role-based access control system 110 (also referred to as RBAC system 110). In various embodiments, services 118 host or include one or more resources 116. A service may use the RBAC system 110 to manage access control. The RBAC system is meant to be a universal system that can be used by multiple services of the communication platform 106 such that each of the services does not need to implement its own access controls.

The communication network 112 is any type of network, including a local area network (LAN), such as an intranet, a wide area network (WAN), such as the internet, a telephone and mobile device network, such as cellular network, or any combination thereof. Further, the communication network 112 may be a public network, a private network, or a combination thereof. The communication network 112 is implemented using any number of communication links associated with one or more service providers, including one or more wired communication links, one or more wireless communication links, or any combination thereof. Additionally, the communication network 112 is configured to support the transmission of data formatted using any number of protocols.

Multiple computing devices can be connected to the communication network 112. A computing device is any type of general computing device capable of network communication with other computing devices. For example, a computing device can be a personal computing device such as a desktop or workstation, a business server, or a portable computing device, such as a laptop, smart phone, or a tablet personal computer. A computing device can include some or all of the features, components, and peripherals of the machine 800 shown in FIG. 8.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The customer computing system 104 is one or more computing devices associated with a customer of the cloud-based communication platform 106 (also referred to as communication platform 106). A customer may be a business, a company, and/or any other type of entity that uses the services provided by communication platform 106. The customer may provide any type of service, such as a banking service, travel service, retail service, and the like. The service may be an online and/or offline service. That is, the service may be available only online, such as an online retailer, offline, such as a physical retailer, or both online and offline, such as a retailer that provides a website or application as well as a physical retail store.

The customer computing system 104 may facilitate any service of a customer that is provided online. In various embodiments, users of client devices 102 may interact with the customer computing system 104 via communication network 112 to utilize the online service provided by the customer. The customer computing system 104, however, does not have to provide an online service that is accessible to users. That is, the customer computing system 104 may simply be a computing system used by a customer to perform any type of functionality. In various embodiments, a user of a client device 102 may be a person or a group of people. A user may send requests to access certain resources on the communication platform 106. A customer of the customer computing system 104 may be a business, company, and/or any other type of entity that develops applications using client-side SDK kits provided by the communication platform 106. The application (also referred to as application user) may send requests to access certain resources on the communication platform 106.

Although the networked environment 100 in FIG. 1 illustrates only one client device 102, and one customer computing system 104, this is only for ease of explanation and is not meant to be limiting. One skilled in the art would appreciate that the networked environment 100 can include any number of client devices 102, and/or customer computing systems 104. Further, each customer computing system 104 may concurrently interact with any number of client devices 102, and support connections from a variety of different types of client devices 102, such as desktop computers, mobile computers, mobile communications devices, e.g., mobile phones, smart phones, tablets; smart televisions, set-top boxes, and/or any other network-enabled computing devices. Hence, the client devices 102 may be of varying types, capabilities, operating systems, and so forth.

A user interacts with a customer computing system 104 via a client-side application 114 installed on the client devices 102. In some embodiments, the client-side application 114 includes a component specific to the customer computing system 104. For example, the component may be a stand-alone application, one or more application plug-ins, and/or a browser extension. However, the users may also interact with the customer computing system 104 via a third-party application, such as a web browser or messaging application, that resides on the client devices 102 and is configured to communicate with the customer computing system 104. In either case, the client-side application presents a user interface (UI) for the user to interact with the customer computing system 104. For example, the user interacts with the customer computing system 104 via a client-side application integrated with the file system or via a web page displayed using a web browser application.

A user may also interact with communication platform 106 via the client-side application 114 installed on the client devices 102. In some embodiments, the client-side application includes a component specific to the communication platform 106. For example, the component may be a stand-alone application, one or more application plug-ins, and/or a browser extension. In various embodiments, the user may also interact with the communication platform 106 via console interface provided by the communication platform 106, such as a web browser or messaging application configured to communicate with the communication platform 106. In either case, the client-side application presents a user interface (UI) for the user to interact with the communication platform 106.

A user or a customer may interact with communication platform 106 via an API interface or a console interface provided by the communication platform 106.

A customer may use a customer computing system 104 to cause transmission of communication messages (e.g., SMS messages) to intended recipients. For example, a customer computing system 104 may provide online functionality that enables users of the customer computing system 104 to transmit messages to agents of the customer and/or other users. As another example, the customer computing system 104 may transmit messages to users to provide the users with two-factor authentication, password resets, updates, links to content, promotions, etc.

Figure 2:
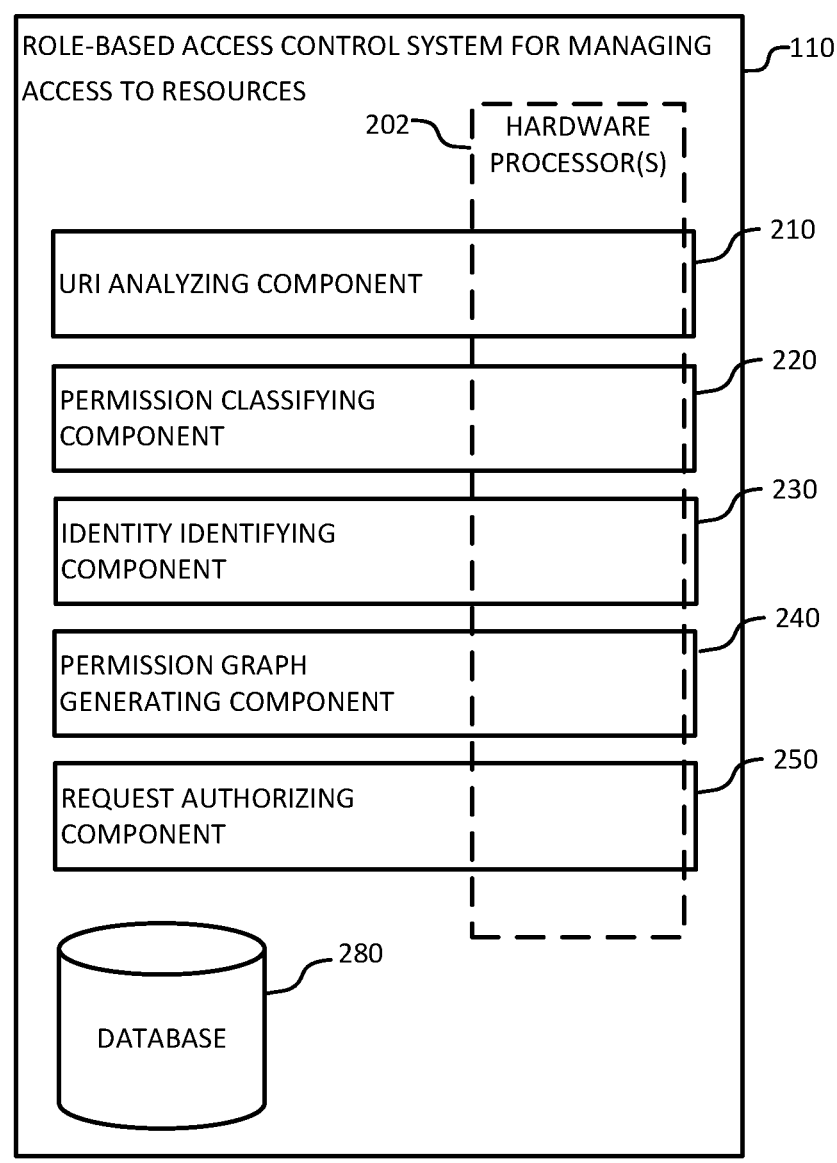
FIG. 2 depicts a block diagram illustrating an example role-based access control system for managing access to resources, according to various example embodiments.

FIG. 2 depicts a block diagram 200 illustrating an example role-based access control system for managing access to resources, according to various example embodiments. For some embodiments, the role-based access control system 110 represents an example of the role-based access control system 110 described with respect to FIG. 1. As shown, the role-based access control (RBAC) system 110 comprises a URI analyzing component 210, a permission classifying component 220, an identity identifying component 230, a permission graph generating component 240, and a request authorizing component 250.

The URI analyzing component 210 is configured to receive a request to provide access to one or more resources on the communication platform 106. In various embodiments, the request may be associated with a URI. The URI analyzing component 210 is configured to analyze the URI to break it down to a format that can be mapped to an existing permission.

Figure 5:
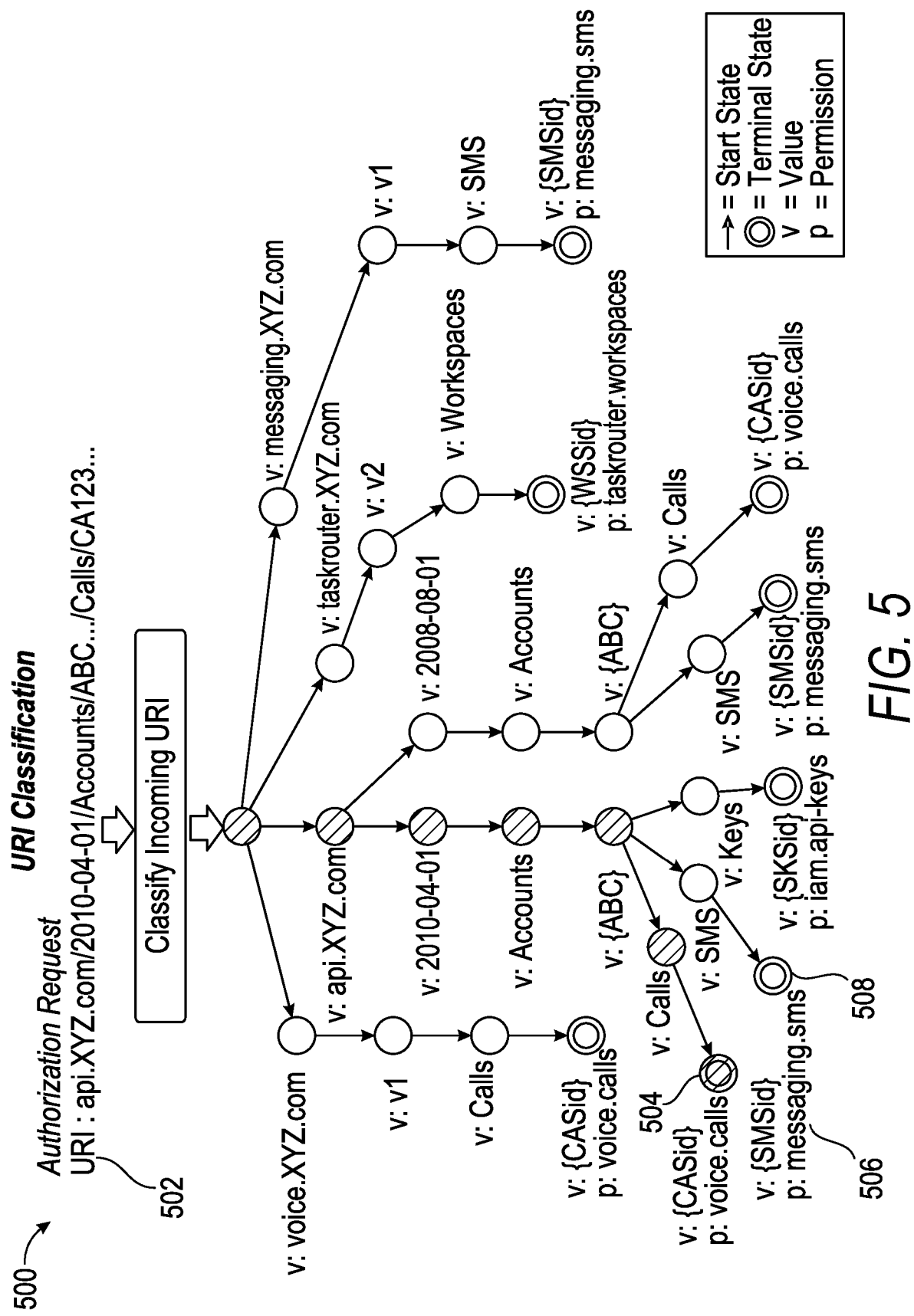
FIG. 5 depicts a block diagram showing an exemplary tree structure illustrating an example URI classifier, according to various example embodiments.

The permission classifying component 220 is configured to classify the URI into a permission (e.g., first permission) that allows the access to a resource on the communication platform 106. In various embodiments, the permission classifying component 220 may construct a tree structure that includes a number of nodes, as illustrated in FIG. 5. The tree structure may also be referred to as a URI classifier. One or more permissions may be identified based on the URI classifier. Each node represents a segment of a URI, such as URI 502, as illustrated in FIG. 5, and is organized based on a URI template. A leaf node (e.g., leaf node 508) represents a classified permission (e.g., permission 506). A permission is represented by a text string that includes a plurality of identifiers, including a namespace identifier, a product identifier, a resource identifier, and an action identifier. In various embodiments, A URI-classifier may be created or updated every time a change occurs to any URI templates mapped to a permission.

The identity authentication component 230 is configured to identify the identity (e.g., a user, an application, or a credential, such as an API key) associated with the request. In various embodiments, the RBAC system uses identity identifying component 230 to identify the identity associated with the request before analyzing the URI via the URI analyzing component 210. The identity may be associated with one or more granted permissions. A user may be a person, or a group of people. A user may be assigned multiple roles. Each role may be associated with one or more permissions to access one or more resources on the communication platform 106.

The permission graph generating component 240 may be configured to identify permissions associated with the identity and generate a graph (e.g., assertion tree) representing the one or more granted permissions associated with the identity at runtime. A graph, as illustrated in FIG. 6, may also be referred to as an assertion tree, representing a number of granted permissions associated with an identity. A graph, once generated, may be stored in volatile computer memory (e.g., cache memory) for a limited time period, as an identity, such as a user, is likely to make another request again shortly after making the first one. In various embodiments, a session may be initiated once a request is authenticated for the identity (e.g., a user, an application, or a credential). The graph may be temporarily stored in cache memory for the duration of the session.

The request authorization component 250 may be configured to authorize the request (e.g., an API request), including traversing the graph to determine that the permission is included in the one or more granted permissions. As illustrated in FIG. 5, permission 506 (i.e., /XYZ/voice/calls/read) is identified from the graph, indicating user, "ABC", has been granted the permission to "read" the resource "calls" for product "voice" that is associated with namespace "XYZ." A namespace may refer to a service provider of the cloud-based communication platform 106.

Figure 3:
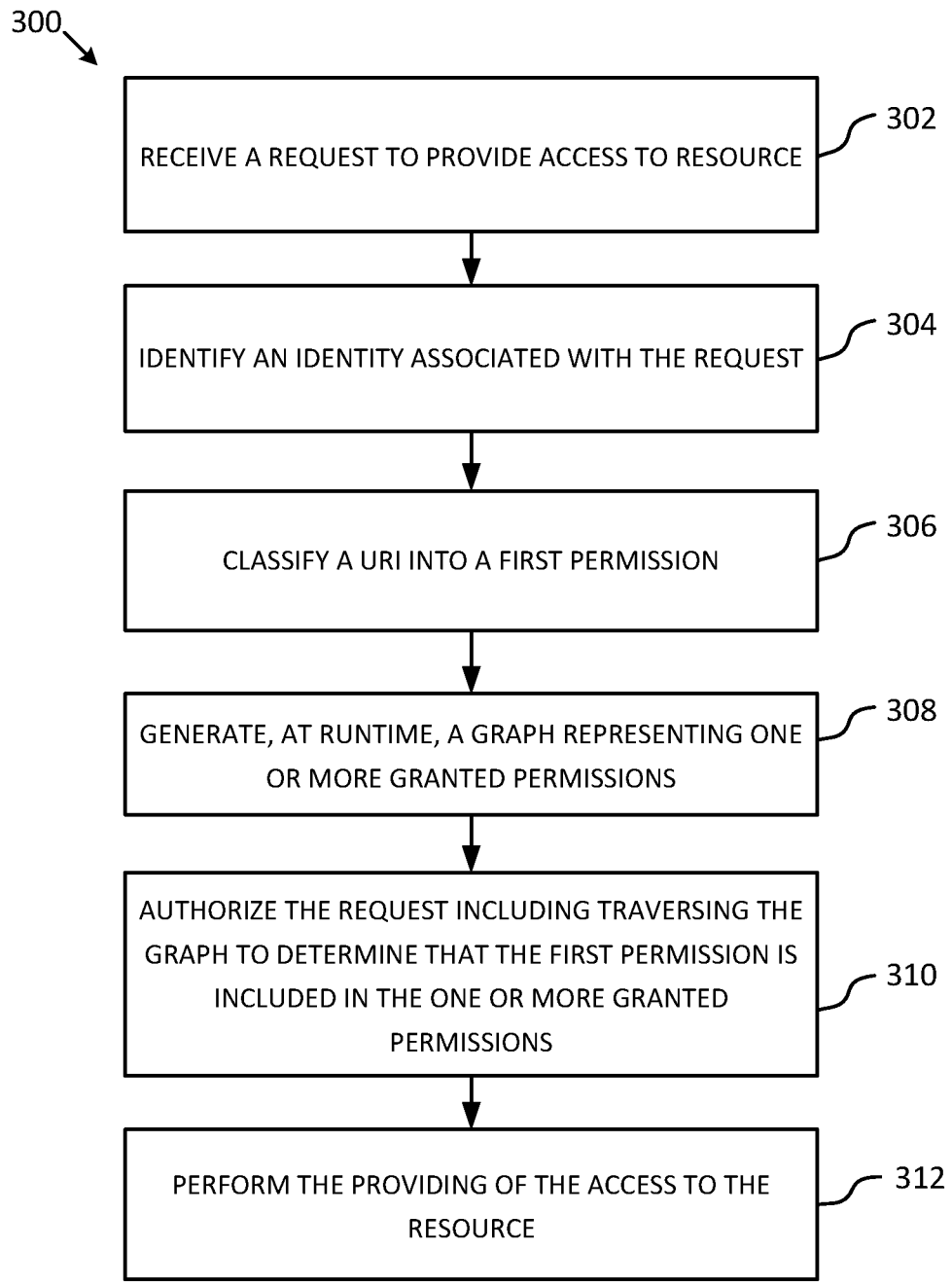
FIG. 3 depicts a flowchart illustrating an example method for managing access to resources by an example role-based access control system during operation, according to various example embodiments.

FIG. 3 depicts a flowchart illustrating an example method 300 for managing access to resources by an example role-based access control system 110 during operation, according to various example embodiments. It will be understood that example methods described herein may be performed by a machine in accordance with some embodiments. For example, method 300 can be performed by the RBAC system 110 described with respect to FIG. 1 and FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 300 may be represented by executable instructions that, when executed by a processor of a computing device, cause the computing device to perform method 300. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 302, the processor receives a request to provide access to one or more resources on the communication platform 106. The request may be an API request that is associated with a URI.

At operation 304, the processor identifies an identity associated with the request. The identity may be associated with one or more granted permissions. A user (e.g., a person, a group of people, or an application user) may be associated with the identity. An identity may be assigned multiple roles. Each role may be associated with one or more permissions to access one or more resources on the communication platform 106.

At operation 306, the processor classifies the URI into a permission (e.g., first permission) to access a resource on the communication platform 106. In various embodiments, the processor may construct a tree structure that includes a number of nodes, as illustrated in FIG. 5. The tree structure may also be referred to as a URI classifier. Each node represents a segment of a URI, such as URI 502, as illustrated in FIG. 5, and is organized based on a URI template. The leaf node (e.g., leaf node 508) represents a classified permission (e.g., permission 506). The permission 506 is associated with a unique identifier (e.g., SMSid). In various embodiments, A URI-classifier may be created or updated every time a change occurs to any URI templates mapped to a permission. In various embodiments, upon detecting a change is made to a URI template, the processor updates the associated URI classifier at run time based on the change.

At operation 308, the processor generates a graph representing the one or more granted permissions associated with the identified identity at runtime. A graph, as illustrated in FIG. 6, may also be referred to as an assertion tree, representing a number of granted permissions associated with the identity. A graph, once generated, may be stored in volatile computer memory (e.g., cache memory) for a limited time period, as a user is likely to make another request again shortly after making the first one. In various embodiments, a session may be initiated once a request is authorized for an identity (e.g., a user, an application, or a credential). The graph may be temporarily stored in cache memory for the duration of the session.

At operation 310, the processor authorizes the request (e.g., an API request), including traversing the graph (e.g., tree structure illustrated in FIG. 6) to determine that the permission is included in the one or more granted permissions for the identity. As illustrated in FIG. 6, permission 602 (i.e., /XYZ/voice/calls/read) is identified from the graph, indicating user "ABC" has been granted the permission to "read" the resource "calls" for product "voice," associated with namespace "XYZ." In various embodiments, a valid action to be included in a permission may be "read," "create," "update," "delete," "list," or "do."

At operation 312, the processor performs the providing of the access to the resource. For example, the processor causes a display of a user interface of a device (e.g., client device 102) associated with the identified identity. The user interface includes an indication of authorization status, indicating whether the request is authorized. For example, the indication of authorization status may be a selectable user interface element (e.g., a window or an icon) notifying the user the request is allowed or denied. In some examples, depending on the type of permission or the gateway (e.g., console interface or API interface) from which a request comes in, the RBAC system may cause the requested resource to be accessible to the requesting identity (e.g., displaying the resource in the user interface) or cause the action specified in the permission to be executed automatically (e.g., deleting the resource specified in the request).

In various embodiments, the RBAC system may receive a request to assign a role to a user. The role may be associated with a list of permissions. The RBAC system may match the list of permission to existing permissions associated with resources on the communication platform 106, and generate the role for the identity, such as by associating the list of permissions with the identity.

In various embodiments, a communication platform may include a number of products in the namespace. A resource is part of a product, or a feature associated with a product. The RBAC system may reside in the communication platform, as illustrated in FIG. 1, or may be an external system that is communicatively coupled to the communication platform.

In various embodiments, a request may be an API request that can be authenticated using an API key. An API request occurs when an identity (e.g., a person or an application) may make a call to a server using an endpoint. An API endpoint refers to a touchpoint of an interaction between an API and a system. An API endpoint provides the location where an API accesses a resource.

In various embodiments, a permission is represented by a text string including a namespace identifier, a product identifier, a resource identifier, and an action identifier.

In various embodiments, a graph is a tree structure representing the one or more granted permissions. The one or more granted permissions correspond to a role assigned to an identity. In various embodiments, permissions may be granted to a credential or an application directly.

Though not illustrated, method 300 can include an operation where a graphical user interface for providing role-based access control can be displayed (or caused to be displayed) by the hardware processor. For instance, the operation can cause a client device (e.g., the client device 102 communicatively coupled to the RBAC system 110) to display the graphical user interface for providing role-based access control. This operation for displaying the graphical user interface can be separate from operations 302 through 312 or, alternatively, form part of one or more of operations 302 through 312.

Figure 4:
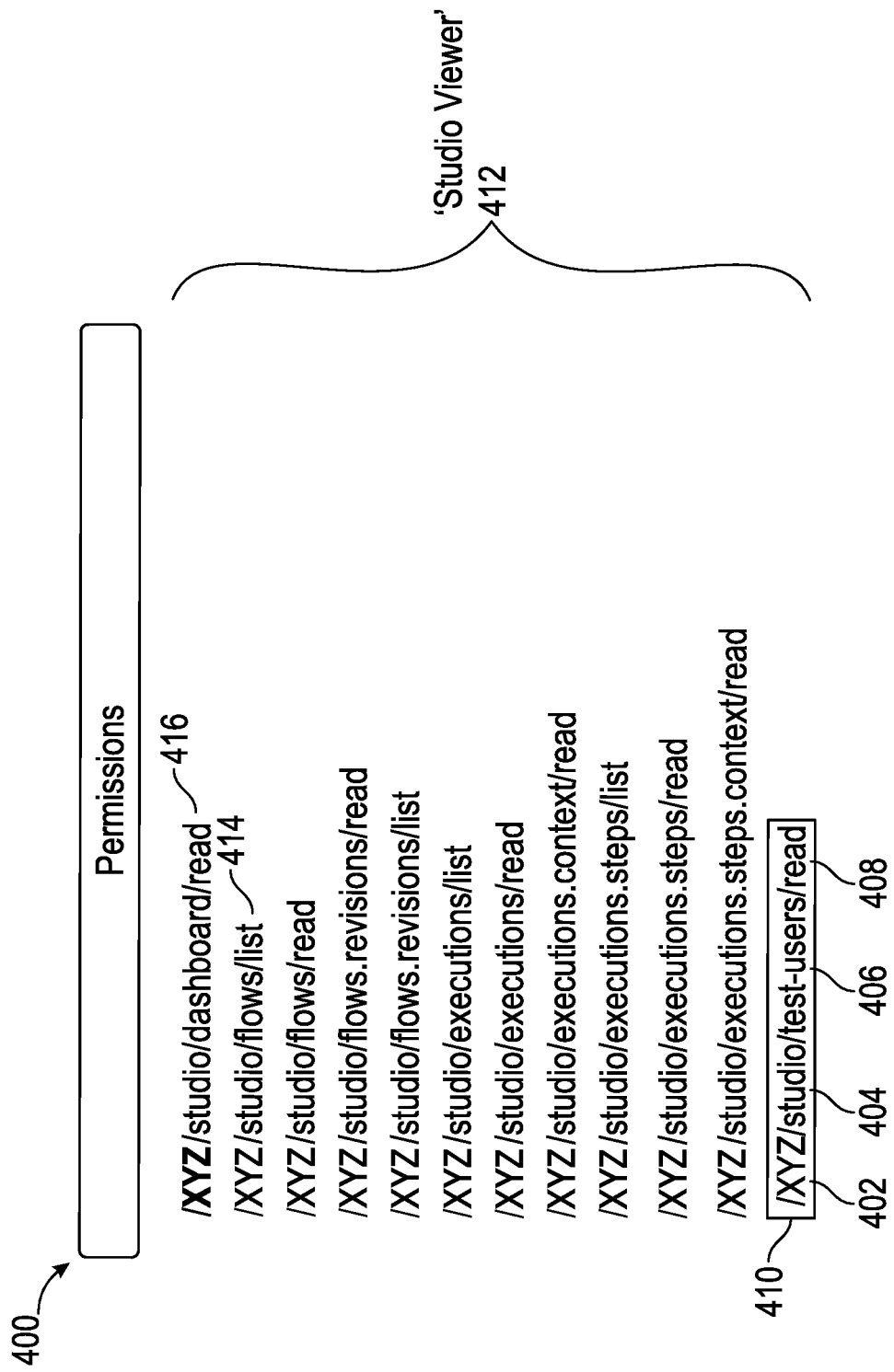
FIG. 4 depicts a block diagram illustrating an example set of permissions included in a role, according to various example embodiments.

FIG. 4 depicts a block diagram 400 illustrating an example set of permissions included in a role, according to various example embodiments. As shown, role 412, named "Studio Viewer," includes a set of permissions, including permission 410. The permission 410, similar to other permissions as illustrated in FIG. 4, is represented by a text string comprising four parts: "XYZ" as namespace identifier 402, "studio" as product identifier 404, "test-users" as resource identifier 406, and "read" as action identifier 408. A namespace may refer to a service provider of the cloud-based communication platform 106. A built-in role represents a known access pattern for a product and is offered out-of-the-box as part of the communication platform. For example, role 412 "Studio Viewer" is a role that allows a user only to view Studio flows and not be able to edit them. As illustrated in FIG. 4, the actions associated with the list of permissions for "Studio Viewer" are limited to "read 416" and "list 414." A role may be a built-in role or a customized role. A built-in role may not be modifiable by a customer or a user. A customer may create and manage their own customized roles to facilitate the services it provides.

FIG. 5 depicts a block diagram 500 showing an exemplary tree structure illustrating an example URI classifier, according to various example embodiments. As shown, the RBAC system 110 may classify a URI into a permission (e.g., first permission) upon receiving an API receive a request to provide access to certain resources. In various embodiments, the RBAC system 110 may construct a tree structure that includes a number of nodes, as illustrated in FIG. 5. The tree structure may also be referred to as a URI classifier. One or more permissions may be identified based on the URI classifier. Each node represents a segment of the URI 502 and is organized based on a URI template. A leaf node (e.g., leaf node 508) represents a classified permission, such as permission 506. The permission 506 is associated with a unique identifier (e.g., SMSid). In various embodiments, A URI-classifier may be created or updated each time a change occurs to a URI template that is mapped to a permission.

FIG. 6 depicts a block diagram 600 illustrating an example assertion tree, according to various example embodiments. In various embodiments, in order to authorize a request, the RBAC system generates a graph, such as an assertion tree, of all the permission a requested user has been granted and traverses the graph to match the classified permission with a permission included in the graph. If the RBAC system determines there is a match, the request will be authorized. Otherwise, the request will be denied. In various embodiments, the assertion tree may be generated at run time and dynamically updated at run time. For example, once an assertion tree is generated at run time, it may be stored in volatile computer memory (e.g., cache memory) for a limited time period, as an identity is likely to request access to resources again shortly after making the first request. In various embodiments, a session may be initiated once a request is authorized for an identity (e.g., a user, an application, or a credential). The graph may be temporarily stored in cache memory for the duration of the session.

Figure 7:
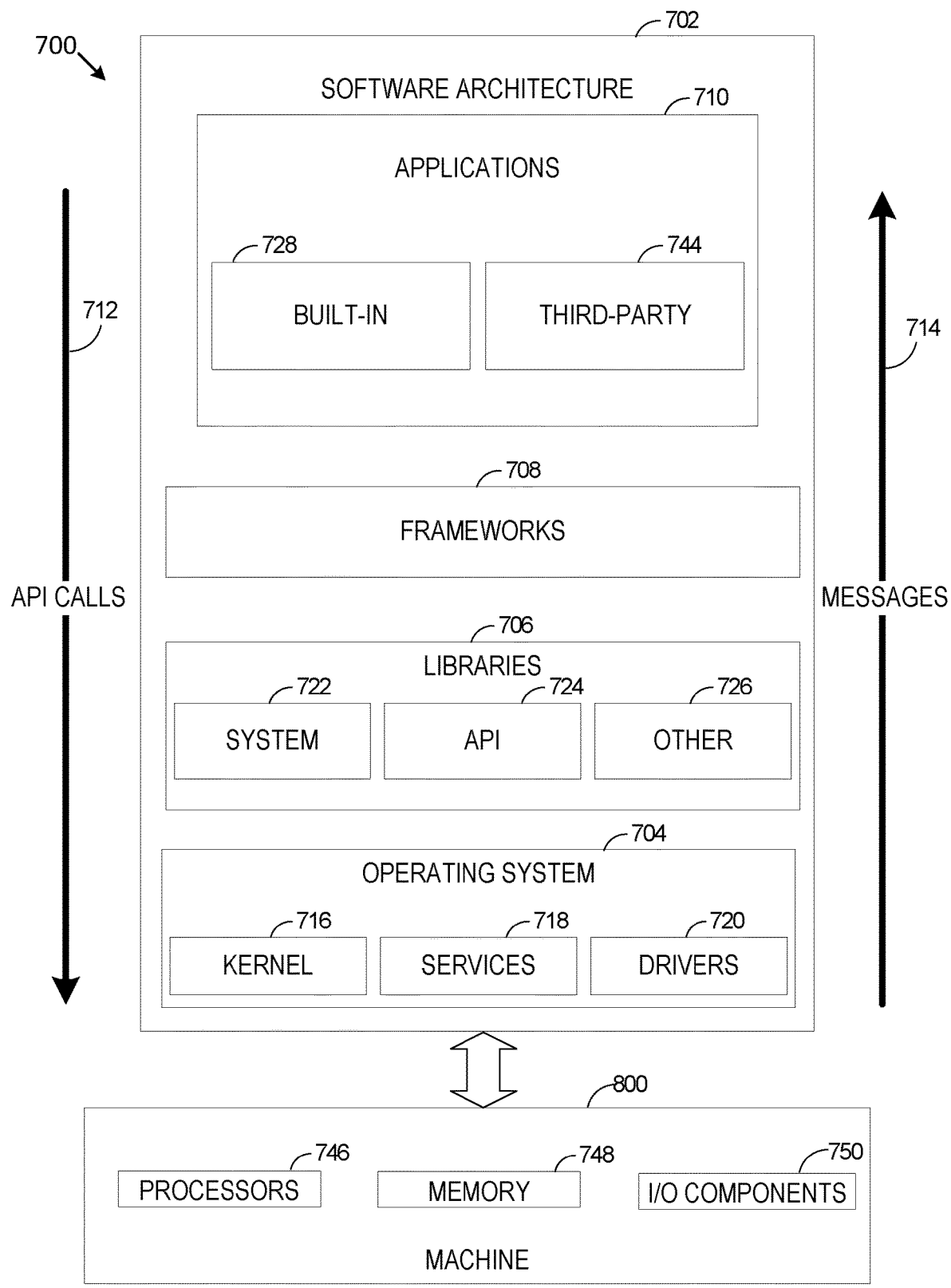
FIG. 7 depicts a block diagram illustrating an architecture of software, according to some embodiments.

FIG. 7 depicts a block diagram 700 illustrating an architecture of software 702, which can be installed on any one or more of the devices described above. FIG. 7 is merely a non-limiting example of a software architecture, and it will be appreciated that many other architectures can be implemented to facilitate the functionality described herein. In various embodiments, the software 702 is implemented by hardware such as a machine 800 of FIG. 8 that includes processor(s) 746, memory 748, and I/O components 750. In this example architecture, the software 702 can be conceptualized as a stack of layers where each layer may provide a particular functionality. For example, the software 702 includes layers such as an operating system 704, libraries 706, frameworks 708, and applications 710. Operationally, the applications 710 invoke API calls 712 (application programming interface) through the software stack and receive messages 714 in response to the API calls 712, consistent with some embodiments.

In various implementations, the operating system 704 manages hardware resources and provides common services. The operating system 704 includes, for example, a kernel 716, services 718, and drivers 720. The kernel 716 acts as an abstraction layer between the hardware and the other software layers, consistent with some embodiments. For example, the kernel 716 provides memory management, processor management (e.g., scheduling), component management, networking, and security settings, among other functionalities. The services 718 can provide other common services for the other software layers. The drivers 720 are responsible for controlling or interfacing with the underlying hardware, according to some embodiments. For instance, the drivers 720 can include display drivers, camera drivers, BLUETOOTH® or BLUETOOTH® Low Energy drivers, flash memory drivers, serial communication drivers (e.g., Universal Serial Bus (USB) drivers), WI-FT® drivers, audio drivers, power management drivers, and so forth.

In some embodiments, the libraries 706 provide a low-level common infrastructure utilized by the applications 710. The libraries 706 can include system libraries 722 (e.g., C standard library) that can provide functions such as memory allocation functions, string manipulation functions, mathematical functions, and the like. In addition, the libraries 706 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 706 can also include a wide variety of other libraries 726 to provide many other APIs to the applications 710.

The frameworks 708 provide a high-level common infrastructure that can be utilized by the applications 710, according to some embodiments. For example, the frameworks 708 provide various graphical user interface (GUI) functions, high-level resource management, high-level location services, and so forth. The frameworks 708 can provide a broad spectrum of other APIs that can be utilized by the applications 710, some of which may be specific to a particular operating system or platform.

In an embodiment, the applications 710 include built-in applications 728 and a broad assortment of other applications, such as a third-party application 744. The built-in applications 728 may include a home application, a contacts application, a browser application, a book reader application, a location application, a media application, a messaging application, a game application. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 744 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 744 can invoke the API calls 712 provided by the operating system 704 to facilitate functionality described herein.

Figure 8:
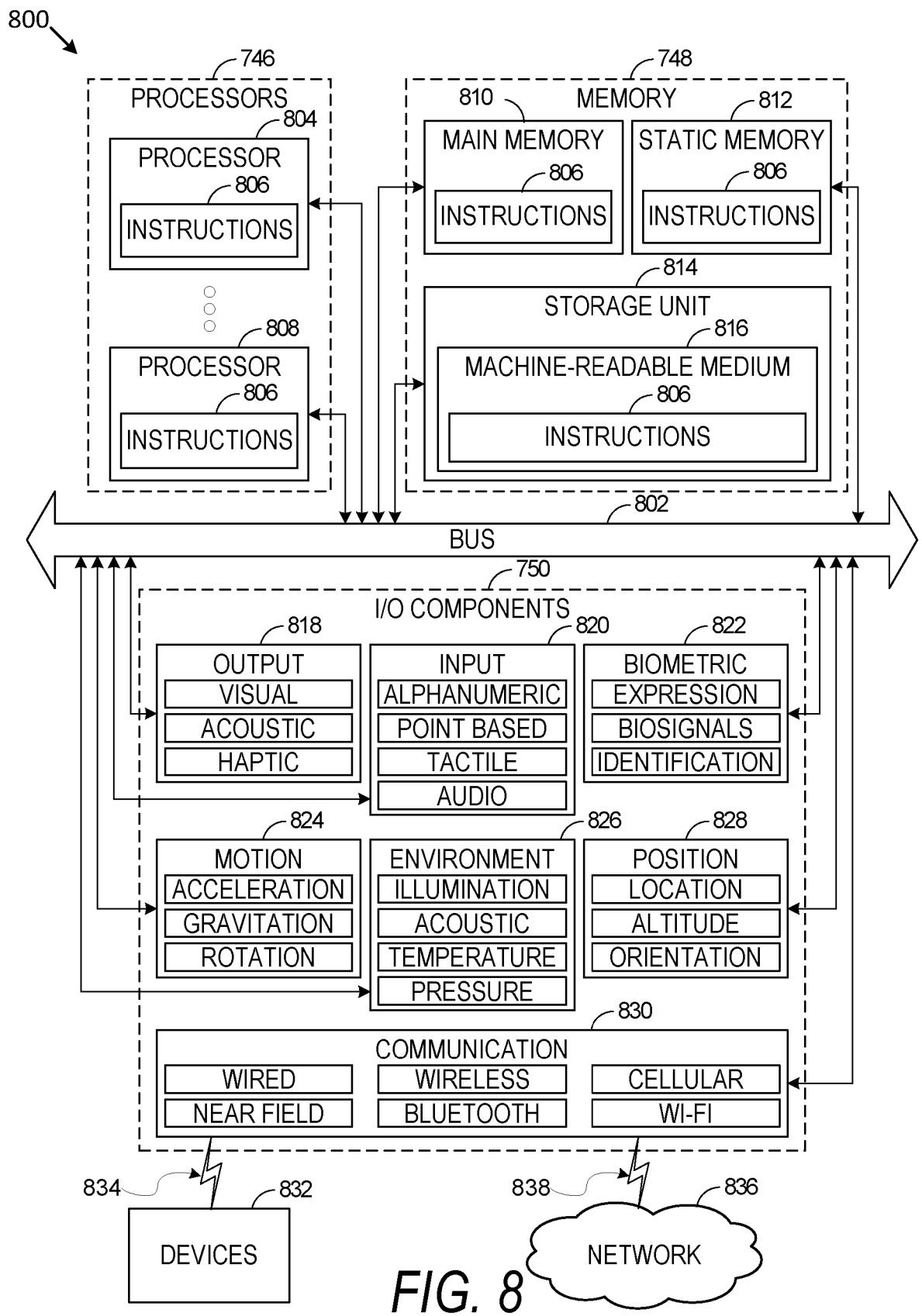
FIG. 8 illustrates a diagrammatic representation of a machine in the form of a computer system within which a set of instructions may be executed for causing a machine to perform any one or more of the methodologies discussed herein, according to some embodiments.

FIG. 8 illustrates a diagrammatic representation of a machine 800 in the form of a computer system within which a set of instructions may be executed for causing the machine to perform any one or more of the methodologies discussed herein, according to some embodiments. Specifically, FIG. 8 shows a diagrammatic representation of the machine 800 in the example form of a computer system, within which instructions 806 (e.g., software, a program, an application, an applet, an app, or other executable code) for causing the machine 800 to perform any one or more of the methodologies discussed herein may be executed. Additionally, or alternatively, the instructions 806 may implement the operations of method 300 shown in FIG. 3, or as elsewhere described herein.

The instructions 806 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 806, sequentially or otherwise, that specify actions to be taken by the machine 800. Further, while only a single machine 800 is illustrated, the term "machine" shall also be taken to include a collection of machines 800 that individually or jointly execute the instructions 806 to perform any one or more of the methodologies discussed herein.

The machine 800 may include processor(s) 746, memory 748, and I/O components 750, which may be configured to communicate with each other such as via a bus 802. In some embodiments, the processor(s) 746 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 804 and a processor 808 that may execute the instructions 806. The term "processor" is intended to include multi-core processors that may comprise two or more independent processors (sometimes referred to as "cores") that may execute instructions contemporaneously. Although FIG. 8 shows multiple processor(s) 746, the machine 800 may include a single processor with a single core, a single processor with multiple cores (e.g., a multi-core processor), multiple processors with a single core, multiple processors with multiple cores, or any combination thereof.

The memory 748 may include a main memory 810, a static memory 812, and a storage unit 814, each accessible to the processor(s) 746 such as via the bus 802. The main memory 810, the static memory 812, and storage unit 814 store the instructions 806 embodying any one or more of the methodologies or functions described herein. The instructions 806 may also reside, completely or partially, within the main memory 810, within the static memory 812, within the storage unit 814, within at least one of the processor(s) 746 (e.g., within the processor's cache memory), or any suitable combination thereof, during execution thereof by the machine 800.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 8. The I/O components 750 are grouped according to functionality merely for simplifying the following discussion and the grouping is in no way limiting. In some embodiments, the I/O components 750 may include output components 818 and input components 820. The output components 818 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 820 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some embodiments, the I/O components 750 may include biometric components 822, motion components 824, environmental components 826, or position components 828, among a wide array of other components. For example, the biometric components 822 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 824 may include acceleration sensor components (e.g., accelerometer), gravitation sensor components, rotation sensor components (e.g., gyroscope), and so forth. The environmental components 826 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 828 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 830 operable to couple the machine 800 to a network 836 or devices 832 via a coupling 838 and a coupling 834, respectively. For example, the communication components 830 may include a network interface component or another suitable device to interface with the network 836. In further examples, the communication components 830 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 832 may be another machine or any of a wide variety of peripheral devices (e.g., a peripheral device coupled via a USB).

Moreover, the communication components 830 may detect identifiers or include components operable to detect identifiers. For example, the communication components 830 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D barcode, and other optical codes), or acoustic detection components (e.g., microphones to identify tagged audio signals). In addition, a variety of information may be derived via the communication components 830, such as location via Internet Protocol (IP) geolocation, location via Wi-Fi® signal triangulation, location via detecting an NFC beacon signal that may indicate a particular location, and so forth.

The various memories (i.e., memory 748, main memory 810, and/or static memory 812) and/or storage unit 814 may store one or more sets of instructions and data structures (e.g., software) embodying or utilized by any one or more of the methodologies or functions described herein. These instructions (e.g., the instructions 806), when executed by processor(s) 746, cause various operations to implement the disclosed embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In various embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers, with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In some embodiments, one or more portions of the network 836 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 836 or a portion of the network 836 may include a wireless or cellular network, and the coupling 838 may be a Code Division Multiple Access (CDMA) connection, a Global System for Mobile communications (GSM) connection, or another type of cellular or wireless coupling. In this example, the coupling 838 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 806 may be transmitted or received over the network 836 using a transmission medium via a network interface device (e.g., a network interface component included in the communication components 830) and utilizing any one of a number of well-known transfer protocols (e.g., hypertext transfer protocol (HTTP)). Similarly, the instructions 806 may be transmitted or received using a transmission medium via the coupling 834 (e.g., a peer-to-peer coupling) to the devices 832. The terms "non-transitory computer-readable storage medium," "transmission medium" and "signal medium" mean the same thing and may be used interchangeably in this disclosure. The terms "transmission medium" and "signal medium" shall be taken to include any intangible medium that is capable of storing, encoding, or carrying the instructions 806 for execution by the machine 800, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "non-transitory computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Although examples have been described with reference to some embodiments or methods, it will be evident that various modifications and changes may be made to these embodiments without departing from the broader scope of the embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Glossary

"CARRIER SIGNAL" in this context refers to any intangible medium that is capable of storing, encoding, or carrying instructions for execution by the machine 800, and includes digital or analog communications signals or other intangible medium to facilitate communication of such instructions 806. Instructions 806 may be transmitted or received over the network 836 using a transmission medium via a network interface device and using any one of a number of well-known transfer protocols.

"CLIENT DEVICE" in this context refers to any machine 800 that interfaces to a communications network 836 to obtain resources from one or more server systems or other client devices 102. A client device 102 may be, but is not limited to, mobile phones, desktop computers, laptops, PDAs, smart phones, tablets, ultrabooks, netbooks, laptops, multi-processor systems, microprocessor-based or programmable consumer electronics, game consoles, STBs, or any other communication device that a user may use to access a network 732.

"COMMUNICATIONS NETWORK" in this context refers to one or more portions of a network 836 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 836 or a portion of a network 836 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device, or other tangible media able to store instructions 806 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 806. The term "machine-readable medium" shall also be taken to include any medium, or combination of multiple media, that is capable of storing instructions 806 (e.g., code) for execution by a machine 800, such that the instructions 806, when executed by one or more processors 804 of the machine 800, cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 746) may be configured by software (e.g., an application 710 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor 804 or other programmable processors.

Once configured by such software, hardware components become specific machines 800 (or specific components of a machine 800) uniquely tailored to perform the configured functions and are no longer general-purpose processors 804. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 804 configured by software to become a special-purpose processor, the general-purpose processor 804 may be configured as respectively different special-purpose processors (e.g., comprising different hardware components) at different times. Software accordingly configures a particular processor or processors 746, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 802) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 746 that are temporarily configured (e.g., by software) or permanently configured to perform the relevant operations. Whether temporarily or permanently configured, such processors 746 may constitute processor-implemented components that operate to perform one or more operations or functions described herein. As used herein, "processor-implemented component" refers to a hardware component implemented using one or more processors 746. Similarly, the methods described herein may be at least partially processor-implemented, with a particular processor or processors 746 being an example of hardware. For example, at least some of the operations of a method may be performed by one or more processors 746 or processor-implemented components. Moreover, the one or more processors 746 may also operate to support performance of the relevant operations in a "cloud computing" environment or as a "software as a service" (SaaS). For example, at least some of the operations may be performed by a group of computers (as examples of machines 800 including processors 746), with these operations being accessible via a network 836 (e.g., the Internet) and via one or more appropriate interfaces (e.g., an API). The performance of certain of the operations may be distributed among the processors 746, not only residing within a single machine 800, but deployed across a number of machines 800. In some example embodiments, the processors 746 or processor-implemented components may be located in a single geographic location (e.g., within a home environment, an office environment, or a server farm). In other example embodiments, the processors 746 or processor-implemented components may be distributed across a number of geographic locations.

"PROCESSOR" in this context refers to any circuit or virtual circuit (a physical circuit emulated by logic executing on an actual processor 804) that manipulates data values according to control signals (e.g., "commands," "op codes," "machine code," etc.) and which produces corresponding output signals that are applied to operate a machine 800. A processor 804 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 804 may further be a multi-core processor having two or more independent processors 746 (sometimes referred to as "cores") that may execute instructions 806 contemporaneously.

What is claimed is:

1. A method comprising:
receiving a request to provide access to a resource, the request being associated with a Uniform Resource Identifier (URI);
identifying an identity associated with the request, the identity being associated with a plurality of granted permissions;
generating a URI classification tree structure based on the URI, the URI classification tree structure comprises a plurality of leaf nodes, each leaf node representing a classified permission required for authorizing the request;
generating, at runtime, a graph representing the plurality of granted permissions;
traversing the graph to determine that one or more granted permissions in the plurality of granted permissions match one or more classified permissions represented by one or more leaf nodes in the URI classification tree structure;
authorizing the request based on the matched one or more granted permissions represented by the one or more leaf nodes in the URI classification tree structure; and
based on the authorizing the request, providing the access to the resource.

2. The method of claim 1, wherein each classified permission is represented by a text string including a namespace identifier, a product identifier, a resource identifier, and an action identifier.

3. The method of claim 1, wherein the graph is a tree structure representing the one or more granted permissions, and wherein the one or more granted permissions correspond to a role assigned to the identity.

4. The method of claim 1, wherein the identity is any one of: a user, an application, or a credential.

5. The method of claim 1, wherein each of the one or more granted permissions is associated with a valid action including any one of: read, create, update, delete, list, or do.

6. The method of claim 1, wherein the request is an API request.

7. The method of claim 1, comprising:
generating the URI classification tree structure further based on a URI template.

8. The method of claim 7, wherein each node in the URI classification tree structure is organized based on the URI template.

9. The method of claim 7, comprising:
detecting a change associated with the URI template; and
updating the URI classification tree structure at run time based on the change.

10. A system comprising:
a memory storing instructions; and
one or more hardware processors communicatively coupled to the memory and configured by the instructions to perform operations comprising:
receiving a request to provide access to a resource, the request being associated with a Uniform Resource Identifier (URI);
identifying an identity associated with the request, the identity being associated with a plurality of granted permissions;
generating a URI classification tree structure based on the URI, the URI classification tree structure comprises a plurality of leaf nodes, each leaf node representing a classified permission required for authorizing the request;
generating, at runtime, a graph representing the plurality of granted permissions;
traversing the graph to determine that one or more granted permissions in the plurality of granted permissions match one or more classified permissions represented by one or more leaf nodes in the URI classification tree structure;
authorizing the request based on the matched one or more granted permissions represented by the one or more leaf nodes in the URI classification tree structure; and
based on the authorizing the request, providing the access to the resource.

11. The system of claim 10, wherein each classified permission is represented by a text string including a namespace identifier, a product identifier, a resource identifier, and an action identifier.

12. The system of claim 10, wherein the graph comprises a tree structure representing the one or more granted permissions, and wherein the one or more granted permissions correspond to a role assigned the identity.

13. The system of claim 10, wherein the identity comprises any one of: a user, an application, or a credential.

14. The system of claim 10, wherein each of the one or more granted permissions is associated with a valid action including any one of: read, create, update, delete, list, or do.

15. The system of claim 10, wherein the request comprises an API request.

16. The system of claim 10, wherein the operations further comprise:
generating the URI classification tree structure further based on a URI template.

17. The system of claim 16, wherein each node in the URI classification tree structure is organized based on the URI template.

18. The system of claim 16, wherein the operations further comprise:
detecting a change associated with the URI template; and
updating the URI classification tree structure at run time based on the change.

19. A non-transitory computer-readable storage medium comprising instructions that, when executed by a processing device, cause the processing device to perform operations comprising:
receiving a request to provide access to a resource, the request being associated with a Uniform Resource Identifier (URI);
identifying an identity associated with the request, the identity being associated with a plurality of granted permissions;
generating a URI classification tree structure based on the URI, the URI classification tree structure comprises a plurality of leaf nodes, each leaf node representing a classified permission required for authorizing the request;
generating, at runtime, a graph representing the plurality of granted permissions;
traversing the graph to determine that one or more granted permissions in the plurality of granted permissions match one or more classified permissions represented by one or more leaf nodes in the URI classification tree structure;
authorizing the request based on the matched one or more granted permissions represented by the one or more leaf nodes in the URI classification tree structure; and
based on the authorizing the request, providing the access to the resource.

20. The non-transitory computer-readable storage medium of claim 19, wherein each classified permission is represented by a text string including a namespace identifier, a product identifier, a resource identifier, and an action identifier.

* * * * *